US010625561B2

(12) United States Patent
Neu et al.

(10) Patent No.: US 10,625,561 B2
(45) Date of Patent: Apr. 21, 2020

(54) METHODS AND SYSTEMS FOR COORDINATED ZONE OPERATION OF A MULTI-ZONE TRANSPORT REFRIGERATION SYSTEM

(71) Applicant: THERMO KING CORPORATION, Minneapolis, MN (US)

(72) Inventors: Timothy J. Neu, Cottage Grove, MN (US); James E. Conde, Plymouth, MN (US); Brett Heberer, Minneapolis, MN (US); Wayne Donnellan, Oranmore (IE)

(73) Assignee: Thermo King Corporation, Minneapolis, MN (US)

( * ) Notice: Subject to any disclaimer, the term of this patent is extended or adjusted under 35 U.S.C. 154(b) by 74 days.

(21) Appl. No.: 15/349,400

(22) Filed: Nov. 11, 2016

(65) Prior Publication Data
US 2017/0136844 A1 May 18, 2017

Related U.S. Application Data

(60) Provisional application No. 62/255,039, filed on Nov. 13, 2015.

(51) Int. Cl.
*B60H 1/00* (2006.01)
*B60H 1/32* (2006.01)
(Continued)

(52) U.S. Cl.
CPC ..... *B60H 1/00014* (2013.01); *B60H 1/00364* (2013.01); *B60H 1/3232* (2013.01);
(Continued)

(58) Field of Classification Search
CPC ........ F25B 5/02; F25D 11/022; F25D 11/003; F25D 29/003; F25D 2700/12; B60H 1/3232; B60H 1/00014
See application file for complete search history.

(56) References Cited

U.S. PATENT DOCUMENTS

| 5,161,848 A | 11/1992 | Lutton |
| 5,704,676 A | 1/1998 | Hill |

(Continued)

FOREIGN PATENT DOCUMENTS

| EP | 2105688 | 9/2009 |
| EP | 2420788 | 2/2012 |

(Continued)

OTHER PUBLICATIONS

European Search Report issued in corresponding European Application No. 16198712.8 dated Mar. 17, 2017 (10 pages).

*Primary Examiner* — Eric S Ruppert
(74) *Attorney, Agent, or Firm* — Hamre, Schumann, Mueller & Larson, P.C.

(57) ABSTRACT

Methods and systems for coordinated zone operation of the MTRS are provided. The method includes a MTRS controller determining whether a first zone environmental condition difference between a first zone measured environmental condition and a first zone desired set point environmental condition is greater than a first threshold. The method also includes the MTRS controller coordinating operation of the first environmental condition unit and the second environmental condition unit when the first zone environmental condition difference is determined to be greater than the first threshold.

17 Claims, 4 Drawing Sheets

(51) Int. Cl.
  *F25D 29/00*   (2006.01)
  *F25D 11/02*   (2006.01)

(52) U.S. Cl.
  CPC .......... *F25D 11/022* (2013.01); *F25D 29/003* (2013.01); *F25D 2600/04* (2013.01); *F25D 2700/12* (2013.01)

(56) References Cited

U.S. PATENT DOCUMENTS

| | | |
|---|---|---|
| 6,467,293 B1 | 10/2002 | Goosman |
| 6,543,245 B1 | 4/2003 | Waldschmidt et al. |
| 6,640,569 B2 | 11/2003 | Goosman |
| 8,266,917 B2 | 9/2012 | Waldschmidt et al. |
| 8,857,208 B2 | 10/2014 | Malin et al. |
| 9,297,548 B2 | 3/2016 | Mijanovic et al. |
| 2002/0134096 A1* | 9/2002 | Shim .................. F25D 11/022 62/228.1 |
| 2003/0202557 A1 | 10/2003 | Hanson et al. |
| 2008/0092566 A1* | 4/2008 | Rand .................. F25B 41/067 62/115 |
| 2008/0289354 A1 | 11/2008 | Dudley et al. |
| 2012/0000222 A1* | 1/2012 | Fink .................. F25D 29/003 62/115 |
| 2015/0316311 A1 | 11/2015 | Kopecka et al. |

FOREIGN PATENT DOCUMENTS

| | | |
|---|---|---|
| WO | 2014106063 | 7/2014 |
| WO | 2014209780 | 12/2014 |
| WO | 2015074051 | 5/2015 |
| WO | 2015168570 | 11/2015 |

\* cited by examiner

METHODS AND SYSTEMS FOR COORDINATED ZONE OPERATION OF A MULTI-ZONE TRANSPORT REFRIGERATION SYSTEM

FIELD

The embodiments described herein are directed to a multi-zone transport refrigeration system (MTRS) for a refrigerated transport unit. More particularly, the embodiments described herein relate to methods and systems for coordinated zone operation of the MTRS.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the transport unit can include a plurality of zones and the IRS can be a multi-zone TRS (MTRS) that is configured to provide independent climate control to each of the plurality of zones within the transport unit.

SUMMARY

The embodiments described herein are directed to a multi-zone transport refrigeration system (MTRS) for a refrigerated transport unit. More particularly, the embodiments described herein relate to methods and systems for coordinated zone operation of the MTRS.

In particular, two or more heat exchanger units of the MTRS are configured to coordinate with each other in order to increase an off-time of the heat exchanger units of the MTRS and increase a capacity available for the heat exchanger units operating at different environmental set points.

By coordinating operation of the heat exchanger units in two or more fresh temperature zones at the same time, the embodiments described herein can reduce the number of times a prime mover used for powering the MTRS is required to startup during transport, can reduce the number of times the MTRS is required to pre-position one or more throttling valves (e.g., ETVs) of a refrigeration circuit of the MTRS, and can increase the cooling capacity of the MTRS available for the frozen temperature zone. Thus, the fuel efficiency of the MTRS can be improved. Also, the embodiments can ensure that the frozen temperature zone has sufficient capacity to reach the desired set point temperature, as opposed to when heat exchanger units of the fresh temperature zone(s) and the frozen temperature zone(s) are operated independently from each other.

In some embodiments, when heat exchanger unit(s) of a first temperature zone (e.g., a first fresh temperature zone) of the refrigerated transport unit are switched to a COOL mode, heat exchanger unit(s) of a second temperature zone (e.g., a second fresh temperature zone) having a desired set point temperature similar to the set point temperature of the first temperature zone are also forced to switch to the COOL mode when a given set of parameters are met. Once the temperature within the first and second temperature zones are sufficiently close to the desired set point temperatures for the particular zones, the heat exchanger unit(s) of the first and second temperature zones are switched off. This can allow the MTRS to provide maximum cooling capacity to a third temperature zone (e.g., a frozen temperature zone) to reach the desired set point temperature.

In one embodiment, a method for coordinated zone operation of the MTRS is provided. The method includes a MTRS controller determining whether a first zone environmental condition difference between a first zone measured environmental condition and a first zone desired set point environmental condition is greater than a first threshold. The method also includes the MTRS controller coordinating operation of the first environmental condition unit and the second environmental condition unit when the first zone environmental condition difference is determined to be greater than the first threshold.

In another embodiment, a MTRS for a refrigerated transport unit that includes a plurality of zones is provided. The MTRS includes a first environmental condition unit, a second environmental condition unit and a M IRS controller. The first environmental condition unit is configured to control an environmental condition within a first zone of the refrigerated transport unit. The second environmental condition unit is configured to control the environmental condition within a second zone of the refrigerated transport unit. The MTRS controller is configured to control operation of the first environmental condition unit and the second environmental condition unit. The MTRS controller is configured to determine whether a first zone environmental condition difference between a first zone measured environmental condition and a first zone desired set point environmental condition is greater than a first threshold. Also, the MTRS controller is configured to coordinate operation of the first environmental condition unit and the second environmental condition unit when the first zone environmental condition difference is determined to be greater than the first threshold.

In yet another embodiment, a refrigerated transport unit is provided. The refrigerated transport unit includes a transport unit having an internal space that includes a plurality of zones and a MTRS. The MTRS includes a first environmental condition unit, a second environmental condition unit and a MTRS controller. The first environmental condition unit is configured to control an environmental condition within a first zone of the refrigerated transport unit. The second environmental condition unit is configured to control the environmental condition within a second zone of the refrigerated transport unit. The MTRS controller is configured to control operation of the first environmental condition unit and the second environmental condition unit. The MTRS controller is configured to determine whether a first zone environmental condition difference between a first zone measured environmental condition and a first zone desired set point environmental condition is greater than a first threshold. Also, the MTRS controller is configured to coordinate operation of the first environmental condition unit and the second environmental condition unit when the first zone environmental condition difference is determined to be greater than the first threshold.

DETAILED DESCRIPTION

Figure 1:
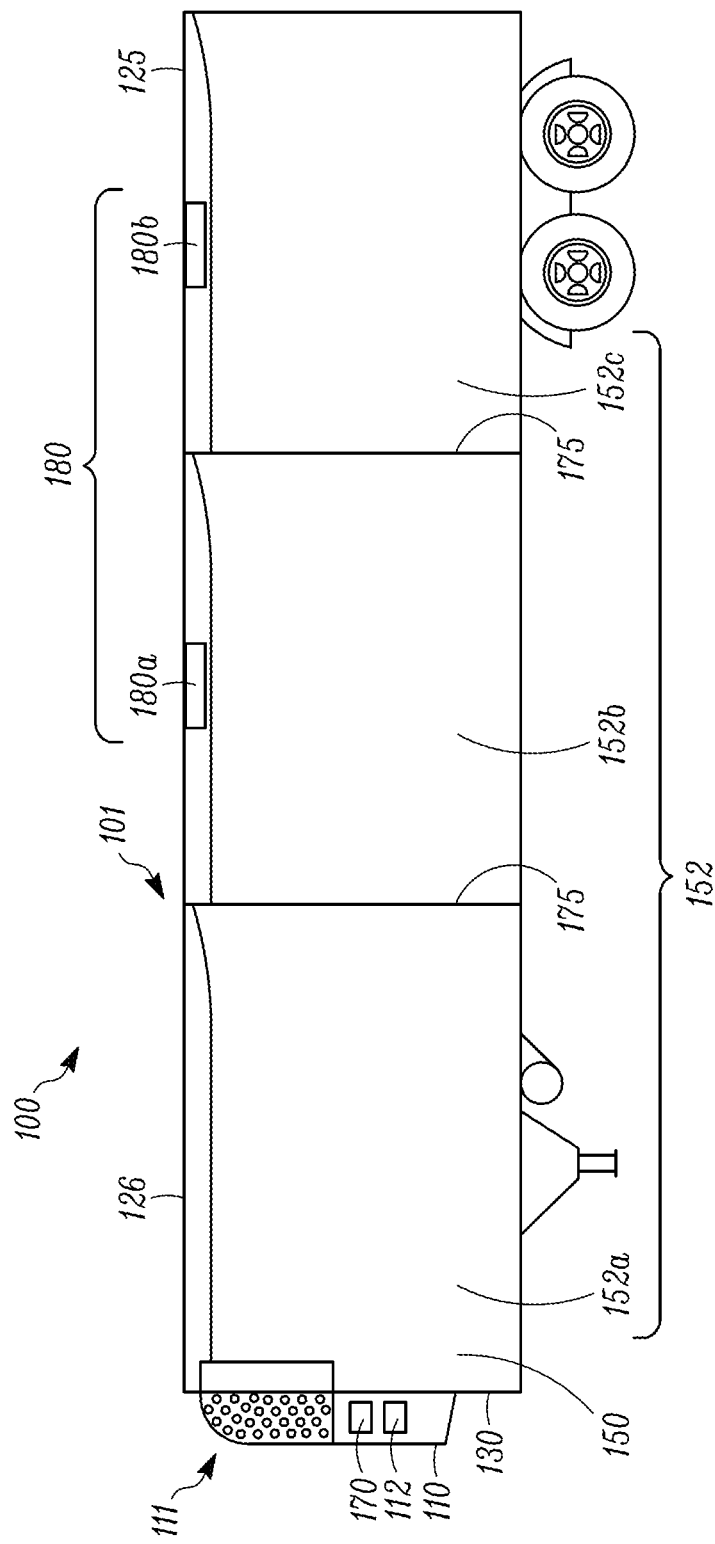
FIG. 1 illustrates a schematic cross sectional side view of a refrigerated transport unit, according to one embodiment.

The embodiments described herein are directed to a multi-zone transport refrigeration system (MTRS). More particularly, the embodiments described herein relate to methods and systems for coordinated zone operation of the MTRS.

In particular, two or more heat exchanger units of the MTRS are configured to coordinate with each other in order to increase an off-time of the heat exchanger units of the MTRS and increase a capacity available for the heat exchanger units operating at different environmental set points.

References are made to the accompanying drawings that form a part hereof, and in which is shown by way of illustration of the embodiments in which the methods and systems described herein may be practiced.

The TRS is generally used to control an environmental condition (e.g., temperature, humidity, air quality, and the like) within a transport unit (e.g., a container (such as a container on a flat car, an intermodal container, etc.), a truck, a box car, or other similar transport unit). The transport unit can include a plurality of zones and the TRS can be a multi-zone TRS (MTRS). Each zone may require a climate condition (e.g., temperature, humidity, air quality, etc.) that is different from other zone(s). The MTRS can be configured to provide independent climate control to each of the plurality of zones within the transport unit.

The MTRS may have one host unit and one or more remote units (together referred to herein as heat exchanger units) that are each configured to provide climate control to each of the one or more zones within the multi-zone transport unit. A TRU of the MTRS may include a compressor, an expansion valve, a first heat exchanger (e.g., condenser), and a host unit. The host unit can include a second heat exchanger (e.g., a host evaporator), one or more fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the MTRS.

Each remote unit may have a remote heat exchanger (e.g., a remote evaporator), one or more fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the M IRS. Each remote unit can be connected to the TRU via a common refrigerant line. One remote unit may be used to provide climate control for one zone of the transport unit.

The MTRS can be used to, for example, cool, heat, and defrost the two or more zones of the transport unit. Note that in some instances, the remote unit may have two or more remote heat exchangers (e.g., a first remote evaporator and a second remote evaporator connected in parallel or in series).

The MTRS includes a refrigeration circuit and a controller (e.g., a MTRS controller) that is configured to manage, command, direct, and regulate the behavior of one or more components of the refrigeration circuit (e.g., an evaporator, a condenser, a compressor, an expansion device, etc.). The MTRS controller can also be configured to manage, command, direct, and regulate the behavior of the host unit and the one or more remote units. The MTRS generally may be a vapor-compressor type refrigeration system, or any other suitable refrigeration system that can use refrigerant, cold plate technology, etc.

The term "ambient temperature" as used herein refers to an air temperature outside of the transport unit.

FIG. 1 illustrates one embodiment of a MTRS 100 for a transport unit (TU) 125 that can be towed, for example, by a tractor (not shown). The MTRS 100 includes a transport refrigeration unit (TRU) 110 that provides environmental control (e.g. temperature, humidity, air quality, etc.) within an internal space 150 of the TU 125. The MTRS 100 also includes a MTRS controller 170 and one or more sensors (not shown) that are configured to measure one or more parameters of the MTRS 100 and communicate parameter data to the MTRS controller 170. The MTRS 100 is powered by a power source 112. The TRU 110 is disposed on a front wall 130 of the TU 125. In other embodiments, it will be appreciated that the TRU 110 can be disposed, for example, on a rooftop 126 or another wall of the TU 125.

The TU 125 shown in FIG. 1 is a trailer unit. However, it will be appreciated that the embodiments described herein are not limited to trucks and trailer units, but can apply to any other type of transport unit (e.g., a container on a flat car, an intermodal container, etc.), a truck, a box car, or other similar transport unit.

The programmable MTRS Controller 170 that may comprise a single integrated control unit or may comprise a distributed network of TRS control elements. The number of distributed control elements in a given network can depend upon the particular application of the principles described herein. The MTRS controller 170 is configured to control operation of the MTRS 100. The MTRS controller 170 may also regulate the operation of the MTRS 100 to prevent overloading a power source, for example a combustion engine (e.g., a diesel engine, a natural gas engine, a petrol engine, etc.), during an operational mode change of the TRS as described in more detail below.

As shown in FIG. 1, the power source 112 is disposed in the TRU 110. In other embodiments, the power source 112 can be separate from the TRU 110. Also, in some embodiments, the power source 112 can include two or more different power sources disposed within or outside of the TRU 110. In some embodiments, the power source 112 can include a combustion engine, a battery, an alternator, a generator, a solar panel, a fuel cell, etc. When the power source 112 includes a combustion engine, the combustion engine can be less than a 25 horse power engine. Also, the combustion engine can be a two speed engine, a variable speed engine, etc. In some instances, the power source 112 can be required to not exceed a predefined power level. Exceeding the predefined power level can, for example, prevent the power source 112 from overloading, can prevent the power source 112 from exceeding, for example, government or customer requirements (e.g., noise level regulations, emission regulations, fuel usage limits, etc.).

The internal space 150 is divided into a plurality of zones 152. The term "zone" means a part of an area of the internal space 150 separated by walls 175. In some examples, each of the zones 152 can maintain a set of environmental condition parameters (e.g. temperature, humidity, air quality, etc.) that is independent from other zones 152.

Note that in FIG. 1 the internal space 150 is divided into three zones: a first zone 152a; a second zone 152b; and a third zone 152c. Each of the zones 152 shown in FIG. 1 is divided into substantially equal areas. However, it is to be realized that the internal space 150 may be divided into any number of zones in any size configuration that is suitable for environmental control of the different zones.

The MTRS 100 is configured to control and maintain separate environmental condition requirements in each of the zones 152. The MTRS 100 includes a host unit 111 provided within the TRU 110 for providing climate control within the first zone 152a and a plurality of remote units 180 disposed in the TU 125. Namely a first remote unit 180a is disposed in the second zone 152b and a second remote unit 180b is disposed in the third zone 152c. The host unit 111 and the remote units 180 are collectively referred to herein as heat exchange units. In one embodiment, the first zone 152a can be a frozen temperature zone operating to maintain a temperature set point within a frozen temperature range and the second and third zones 152b, 152c can be fresh temperature zones operating to maintain a temperature set point within a fresh temperature range. In one embodiment, for example, the frozen temperature range can be between about −25° F. to about 15° F. and the fresh temperature range can be between about 16° F. to about 90° F. In another embodiment, for example, the frozen temperature range can be between about −25° F. to about 24° F. and the fresh temperature zone can be between about 26° F. to about 90° F. It will be appreciated that in other embodiments, any of the first, second and third zones 152a-c can be a fresh temperature zone operating to maintain a temperature set point within a fresh temperature range or a frozen temperature zone operating to maintain a temperature set point within a frozen temperature range.

Each remote unit 180a, 180b is fluidly connected to the host unit 111. The host unit 111 and each remote unit 180a, 180b may include one or more heat exchangers (e.g., evaporator(s)), one or more fan(s) for providing climate control within the particular zone the heat exchanger unit is located, one or more flow regulating devices (e.g., solenoid valve(s), etc.) for controlling the amount of refrigerant flow into the heat exchanger unit, and one or more throttling devices (e.g., electronic throttling valve(s), etc.) for controlling the amount of refrigerant flow available to a suction end of the compressor of the MTRS 100. The heat exchange units (e.g., the host unit 111 and each of the remote units 180) can operate in a plurality of operational modes (e.g., a NULL mode, a running NULL mode, a COOL mode, a HEAT mode, a DEFROST mode, a low fan speed mode, a high fan speed mode, a high engine speed mode, a low engine speed mode, etc.).

In the NULL mode, the MTRS 100 can be configured to prevent refrigerant flow through the heat exchanger unit and stop operation of the fan(s). In the running NULL mode, the MTRS 100 can be configured to prevent refrigerant flow through the heat exchanger unit and continue operation of the fan(s). In the COOL mode, the MTRS 100 can be configured to provide refrigerant flow through the heat exchanger unit and/or allow operation of the fan(s) in order to provide cooling within the respective zone 152 of the transport unit 125. In the HEAT mode, the MTRS 100 can be configured to provide refrigerant flow through the heat exchanger unit and/or allow operation of the fan(s) in order to provide heating within the respective zone 152 of the transport unit 125. In the DEFROST mode, the MTRS 100 can be configured to provide refrigerant flow through the heat exchanger unit and/or allow operation of the fan(s) in order to provide defrosting of one or more refrigeration components of the refrigeration circuit of the MTRS 100. In the low fan speed mode, the MTRS 100 can be configured to operate the fan(s) at a low speed when the fan(s) are two speed or variable speed fan(s). In the high fan speed mode, the MTRS 100 can be configured to operate the fan(s) at a high speed when the fan(s) are two speed or variable speed fan(s). In the low engine speed mode, the MTRS 100 can be configured to operate an engine of the power source at a low speed when the engine is two speed or variable speed engine. In the high engine speed mode, the MTRS 100 can be configured to operate an engine of the power source at a high speed when the engine is two speed or variable speed engine.

When the MTRS 100 changes an operational mode of one of the heat exchanger units (e.g., from the NULL mode to the COOL mode or vice versa, from the NULL mode to the HEAT mode or vice versa, from the COOL mode to the HEAT mode or vice versa, or a transition between any of the operation modes described above, etc.), the power available to the MTRS 100 can exceed the predefined power level of the power source 112.

Figure 2A:
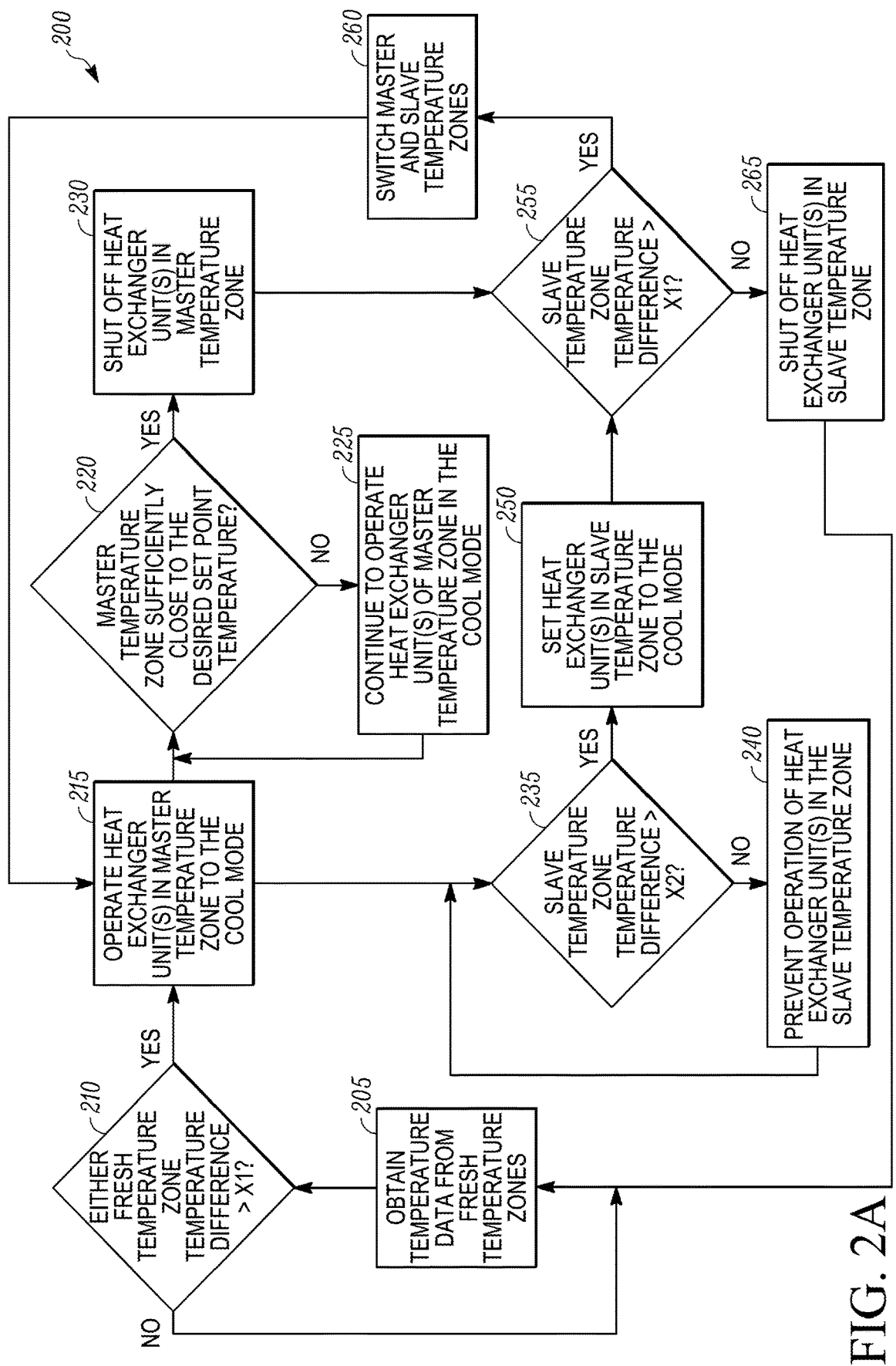
FIGS. 2A and 2B illustrate two embodiments of a method for providing coordinated cooling control of a MTRS within two or more zones of a refrigerated transport unit.
Figure 2B:
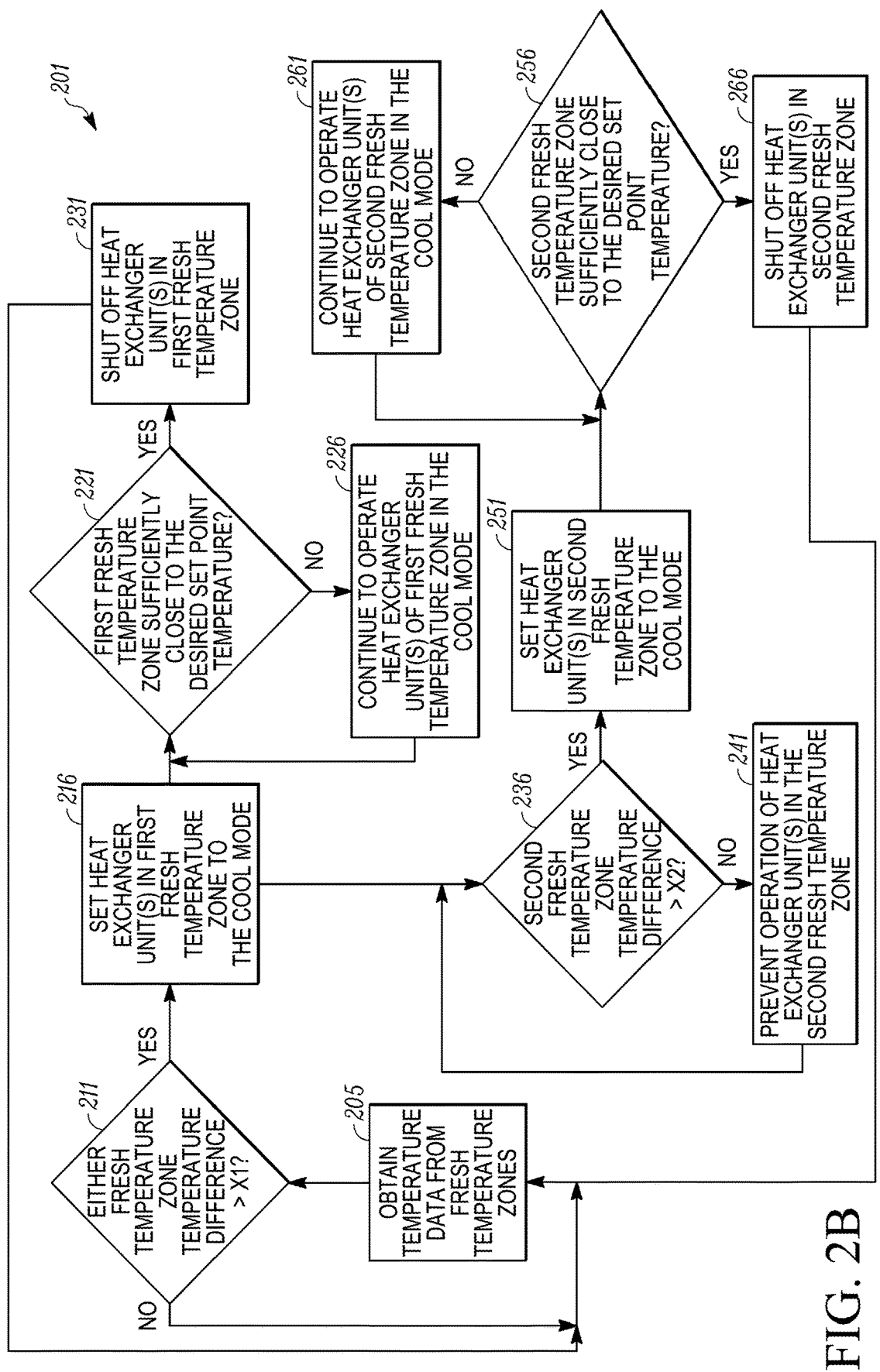

FIGS. 2A and 2B illustrate flowcharts of two different methods 200, 201 for providing coordinated cooling control of the MTRS (e.g., the MTRS 100 shown in FIG. 1) within two or more zones of a refrigerated transport unit (e.g., the TU 125 shown in FIG. 1). In both embodiments, the refrigerated transport unit includes three zones (Zone A, Zone B, Zone C) with the heat exchanger unit(s) for Zone A and the heat exchanger unit(s) for Zone B operating to maintain a temperature set point within a fresh temperature range (e.g., between about 16° F. to about 90° F.: between about 26° F. to about 90° F.; etc.) and the heat exchanger unit(s) for Zone C operating to maintain a temperature set point within a frozen temperature range (e.g., between about −25° F. to about 15° F.; between about −25° F. to about 25° F.; etc.). Also, while the methods 200, 201 are directed to providing coordinated cooling control of the MTRS, it will be appreciated that the embodiments described herein can be used for coordinated heating control, coordinated defrost control, coordinated atmosphere control, coordinated humidity control and any other coordinated environmental condition control of the MTRS within two or more zones of a refrigerated transport unit.

Also, the methods 200, 201 are directed to coordinating cooling control of the heat exchanger units of the fresh temperature zones of the MTRS. In some embodiments, the heat exchanger unit(s) of the frozen temperature zone can operate in the COOL mode anytime a heat exchanger unit for one of the fresh temperature zones is operating in the COOL mode. In other embodiments, the heat exchanger unit(s) of the frozen temperature zone can be configured to operate in the COOL mode independently and irrespective of whether the heat exchanger units of the fresh temperature zones is operating the COOL mode. It will be appreciated that in other embodiments coordinated cooling control of the MTRS can include coordinated cooling control of one or more fresh temperature zones and one or more frozen temperature zones. In yet some other embodiments, coordinated cooling control of the MTRS can include coordinated cooling control of two or more frozen temperature zones with one or more fresh temperature zones of the MTRS being coordinated with the coordinated cooling control of the two or more frozen temperature zones or operating independently of the two or more frozen temperature zones.

Referring to FIG. 2A, the MTRS controller is configured to operate the heat exchanger units of the first and second fresh temperature zones using a master/slave relationship. The method 200 begins at 205 whereby a MTRS controller (e.g., the MTRS controller 170 shown in FIG. 1) obtains temperature data (e.g., return air temperature data) from the fresh temperature zones (i.e., Zone A and Zone B). In some embodiments, each of Zones A, B and C can include a temperature sensor configured to measure a return air temperature within the particular zone and communicate return air temperature data to the MTRS controller. Also, in some embodiments, the method 200 can be performed continuously while, for example, the MTRS is in transport and/or storing cargo.

At 210, the MTRS controller is configured to determine whether a temperature difference between the return air temperature obtained at 205 of either of the fresh temperature zones and the desired return air temperature set point for the respective fresh temperature zone is greater than a first threshold X1. That is, the MTRS controller determines whether the return air temperature at one of the fresh temperature zones is the first threshold X1 degrees above the desired return air temperature set point for the particular fresh temperature zone. It will be appreciated that the first threshold X1 can be a preset value defined, for example, by the user. For example, in one embodiment, the first threshold X1 can be about 5° F. If the temperature difference is greater than the first threshold X1 for either of the fresh temperature zones, the method 200 proceeds to 215. If the temperature difference is less than or equal to the first threshold X1 for both of the fresh temperature zones, the method 200 continues to monitor the temperature difference between the return air temperature of either of the fresh temperature zones and the desired return air temperature set point for the respective fresh temperature zone at 205.

For clarity purposes, a temperature zone determined at 210 to have a temperature difference greater than the first threshold X1 is herein referred to as the master temperature zone and the other fresh temperature zone, regardless of whether that fresh temperature zone has a temperature difference greater than the first threshold X1, is referred to as the slave temperature zone.

At 215, the MTRS controller is configured to operate the heat exchanger unit(s) of the master temperature zone to the COOL mode. The method 200 then proceeds concurrently to both 220 and 235.

At 220, the MTRS controller is configured to obtain updated return air temperature data from the master temperature zone and is configured to determine whether the updated return air temperature has reached the desired return air temperature set point for the master temperature zone. If the MTRS controller determines that the updated return air temperature has reached or is sufficiently close to the desired return air temperature set point in the master temperature zone, the method 200 proceeds to 230. If the MTRS controller determines that the updated return air temperature has not reached or is not sufficiently close to the desired return air temperature set point in the master temperature zone, the method proceeds to 225.

The term sufficiently close as used herein can vary based on the requirements of the user and/or the cargo being transported. For example, in some embodiments, sufficiently close can include a determination based on the updated return air temperature data over time that the rate at which the return air temperature is dropping is sufficiently fast such that the heat exchanger unit(s) for the master temperature zone can be shut off (e.g., operate the heat exchanger unit(s) in a NULL mode, a running NULL mode, etc.) and allow the master temperature zone to coast to the desired return air temperature set point.

At 225, the MTRS controller continues to operate the heat exchanger unit(s) of the master temperature zone in the COOL mode, and the method 200 returns to 220.

At 230, the MTRS controller is configured to turn off the heat exchanger unit(s) (e.g., operate the heat exchanger unit(s) in a NULL mode, a running NULL mode, etc.) in the master temperature zone as the updated return air temperature in the master temperature zone has reached or is sufficiently close to the desired return air temperature set point. The method 200 then proceeds to 255.

At 235, the MTRS controller is configured to determine whether a temperature difference between the return air temperature obtained at 205 of the slave temperature zone and the desired return air temperature set point for the slave temperature zone is greater than a second threshold X2. That is, the MTRS controller determines whether the return air temperature at the slave temperature zone is the second threshold X2 degrees above the desired return air temperature set point for the slave temperature zone. It will be appreciated that the second threshold X2 can be a preset value defined, for example, by the user. For example, in one embodiment, the second threshold X2 can be about 1° F. If the temperature difference is greater than the second threshold X2 the method 200 proceeds to 250. If the temperature difference is less than or equal to the second threshold X2, the method 200 proceeds to 240.

In one embodiment, the second threshold X2 can be a lower temperature value than the first threshold X1. This can allow the MTRS controller to coordinate the master and slave temperature zones to provide cooling at the same time.

At 240, the MTRS controller is configured to prevent operation of the heat exchanger unit(s) of the slave temperature zone as the MTRS controller has determined that the measured return air temperature is sufficiently close to the desired return air temperature set point in the slave temperature zone. In some embodiments, preventing operation of the heat exchanger unit(s) of the slave temperature zone can include operating the heat exchanger unit(s) in a NULL mode, a running NULL mode, etc. The method 200 then returns to 235.

At 250, the MTRS controller is configured to switch the heat exchanger unit(s) of the slave temperature zone to the COOL mode. The method 200 then proceeds to 255.

At 255, the MTRS controller is configured to obtain updated return air temperature data from the slave temperature zone and is configured to determine whether a temperature difference between the updated return air temperature of the slave temperature zone and the desired return air temperature set point for the slave temperature zone is greater than the first threshold X1. That is, the MTRS controller determines whether the return air temperature at the slave temperature zone is the first threshold X1 degrees above the desired return air temperature set point for the slave temperature zone. If the temperature difference is greater than the first threshold X1 for the slave temperature zone, the method 200 proceeds to 260. If the temperature difference is less than or equal to the first threshold X1 for the slave temperature zone, the method 200 proceeds to 265.

At 260, the MTRS controller is configured to switch the designation of the two fresh temperature zones such that the slave temperature zone becomes the master temperature zone and the master temperature zone becomes the slave temperature zone. The method 200 then proceeds back to 215.

At 265, the MTRS controller is configured to turn off the heat exchanger unit(s) (e.g., operate the heat exchanger unit(s) in a NULL mode, a running NULL mode, etc.) in the slave temperature zone as the updated return air temperature in the slave temperature zone has reached or is sufficiently close to the desired return air temperature set point.

Referring to FIG. 2B, the MTRS controller is configured to operate the heat exchanger units of the first and second fresh temperature zones according to a second embodiment. In particular, FIG. 2B illustrates a flowchart of a method 201 for providing coordinated cooling control of the MTRS within two or more zones of a refrigerated transport unit.

The method 201 begins at 205 whereby a MTRS controller (e.g., the MTRS controller 170 shown in FIG. 1) obtains temperature data (e.g., return air temperature data) from the fresh temperature zones (i.e., Zone A and Zone B). In some embodiments, each of Zones A, B and C can include a temperature sensor configured to measure a return air temperature within the particular zone and communicate return air temperature data to the MTRS controller. Also, in some embodiments, the method 201 can be performed continuously while, for example, the MTRS is in transport and/or storing cargo. The method 201 then proceeds to 211.

At 211, the MTRS controller is configured to determine whether a temperature difference between the return air temperature obtained at 205 of either of the fresh temperature zones and the desired return air temperature set point for the respective fresh temperature zone is greater than a first threshold X1. That is, the MTRS controller determines whether the return air temperature at one of the fresh temperature zones is the first threshold X1 degrees above the desired return air temperature set point for the particular fresh temperature zone. It will be appreciated that the first threshold X1 can be a preset value defined, for example, by the user. For example, in one embodiment, the first threshold X1 can be about 5° F. If the temperature difference is greater than the first threshold X1 for either of the fresh temperature zones, the method 201 proceeds to 216. For clarity purposes, a temperature zone determined at 211 to have a temperature difference greater than the first threshold X1 is herein referred to as the first fresh temperature zone and the other temperature zone, regardless of whether that fresh temperature zone has a temperature difference greater than the first threshold X1, is referred to as the second fresh temperature zone. If the temperature difference is less than or equal to the first threshold X1 for both of the fresh temperature zones, the method 201 continues to monitor the temperature difference between the return air temperature of either of the fresh temperature zones and the desired return air temperature set point for the respective fresh temperature zone at 205.

At 216, the MTRS controller is configured to switch the heat exchanger unit(s) of the first fresh temperature zone to the COOL mode. The method 201 then proceeds concurrently to both 221 and 236.

At 221, the MTRS controller is configured to obtain updated return air temperature data from the first fresh temperature zone and is configured to determine whether the updated return air temperature has reached the desired return air temperature set point for the first fresh temperature zone. If the MTRS controller determines that the updated return air temperature has reached or is sufficiently close to the desired return air temperature set point in the first fresh temperature zone, the method 201 proceeds to 231. If the MTRS controller determines that the updated return air temperature has not reached or is not sufficiently close to the desired return air temperature set point in the first fresh temperature zone, the method proceeds to 226. The term sufficiently close as used herein can vary based on the requirements of the user and/or the cargo being transported. For example, in some embodiments, sufficiently close can include a determination based on the updated return air temperature data over time that the rate at which the return air temperature is dropping is sufficiently fast such that the heat exchanger unit(s) for the first fresh temperature zone can be shut off (e.g., operate the heat exchanger unit(s) in a NULL mode, a running NULL mode, etc.) and allow the first fresh temperature zone to coast to the desired return air temperature set point. At 226, the MTRS controller continues to operate the heat exchanger unit(s) of the first fresh temperature zone in the COOL mode, and the method 201 returns to 221.

At 231, the MTRS controller is configured to turn off the heat exchanger unit(s) (e.g., operate the heat exchanger unit(s) in a NULL mode, a running NULL mode, etc.) in the first fresh temperature zone as the updated return air temperature in the first fresh temperature zone has reached or is sufficiently close to the desired return air temperature set point. The method 201 then returns to 205.

At 236, the MTRS controller is configured to determine whether a temperature difference between the return air temperature obtained at 205 of the second fresh temperature zone and the desired return air temperature set point for the second fresh temperature zone is greater than a second threshold X2. That is, the MTRS controller determines whether the return air temperature at the second fresh temperature zone is the second threshold X2 degrees above the desired return air temperature set point for the second fresh temperature zone. It will be appreciated that the second threshold X2 can be a preset value defined, for example, by the user. For example, in one embodiment, the second threshold X2 can be about 1° F. If the temperature difference is greater than the second threshold X2, the method 201 proceeds to 251. If the temperature difference is less than or equal to the second threshold X2, the method 201 proceeds to 241.

The second threshold X2 can be a lower temperature value than the first threshold X1. This can allow the MTRS controller to coordinate the first and second fresh temperature zones to provide cooling at the same time.

At 241, the MTRS controller is configured to prevent operation of the heat exchanger unit(s) of the second fresh temperature zone as the MTRS controller has determined that the measured return air temperature is sufficiently close to the desired return air temperature set point in the second fresh temperature zone. In some embodiments, preventing operation of the heat exchanger unit(s) of the second fresh temperature zone can include operating the heat exchanger unit(s) in a NULL mode, a running NULL mode, etc. The method 201 then returns to 236.

At 251, the MTRS controller is configured to switch the heat exchanger unit(s) of the second fresh temperature zone to the COOL mode. The method 201 then proceeds to 256.

At 256, the MTRS controller is configured to obtain updated return air temperature data from the second fresh temperature zone and is configured to determine whether the updated return air temperature has reached or is sufficiently close to the desired return air temperature set point for the second fresh temperature zone. If the MTRS controller determines that the updated return air temperature has reached or is sufficiently close to the desired return air temperature set point in the second fresh temperature zone, the method 201 proceeds to 266. If the MTRS controller determines that the updated return air temperature has not reached or is not sufficiently close to the desired return air temperature set point, the method returns to 261. The term sufficiently close as used herein can vary based on the requirements of the user and/or the cargo being transported. For example, in some embodiments, sufficiently close can include a determination based on the updated return air temperature data over time that the rate at which the return air temperature is dropping is sufficiently fast such that the heat exchanger unit(s) for the second fresh temperature zone can be shut off (e.g., operate the heat exchanger unit(s) in a NULL mode, a running NULL mode, etc.) and allow the first fresh temperature zone to coast to the desired return air temperature set point. At 261, the MTRS controller continues to operate the heat exchanger unit(s) of the second fresh temperature zone in the COOL mode, and the method 201 returns to 256.

At 266, the MTRS controller is configured to turn off the heat exchanger unit(s) (e.g., operate the heat exchanger unit(s) in a NULL mode, a running NULL mode, etc.) in the second fresh temperature zone as the updated return air temperature in the second fresh temperature zone has reached or is sufficiently close to the desired return air temperature set point.

Accordingly, the methods 200, 201 provide coordination between the first and second fresh temperature zones to provide cooling at the same time and then allowing the frozen temperature zone to provide cooling while the heat exchanger units in the first and second fresh temperature zones are off. By running the heat exchanger units in the fresh temperature zones at the same time the MTRS can reduce the number of times the prime mover is required to startup during transport, can reduce the number of times the MTRS is required to pre-position one or more throttling valves (e.g., ETVs) of the refrigeration circuit, and can increase the cooling capacity of the MTRS available for the frozen temperature zone. Thus, the fuel efficiency of the MTRS can be improved. Also, when the heat exchanger units of the first and second fresh temperature zones are shut off, the MTRS can provide a maximum available cooling capacity of the MTRS to the frozen temperature zone depending on the cooling requirements for the frozen temperature zone at that time.

Figure 3:
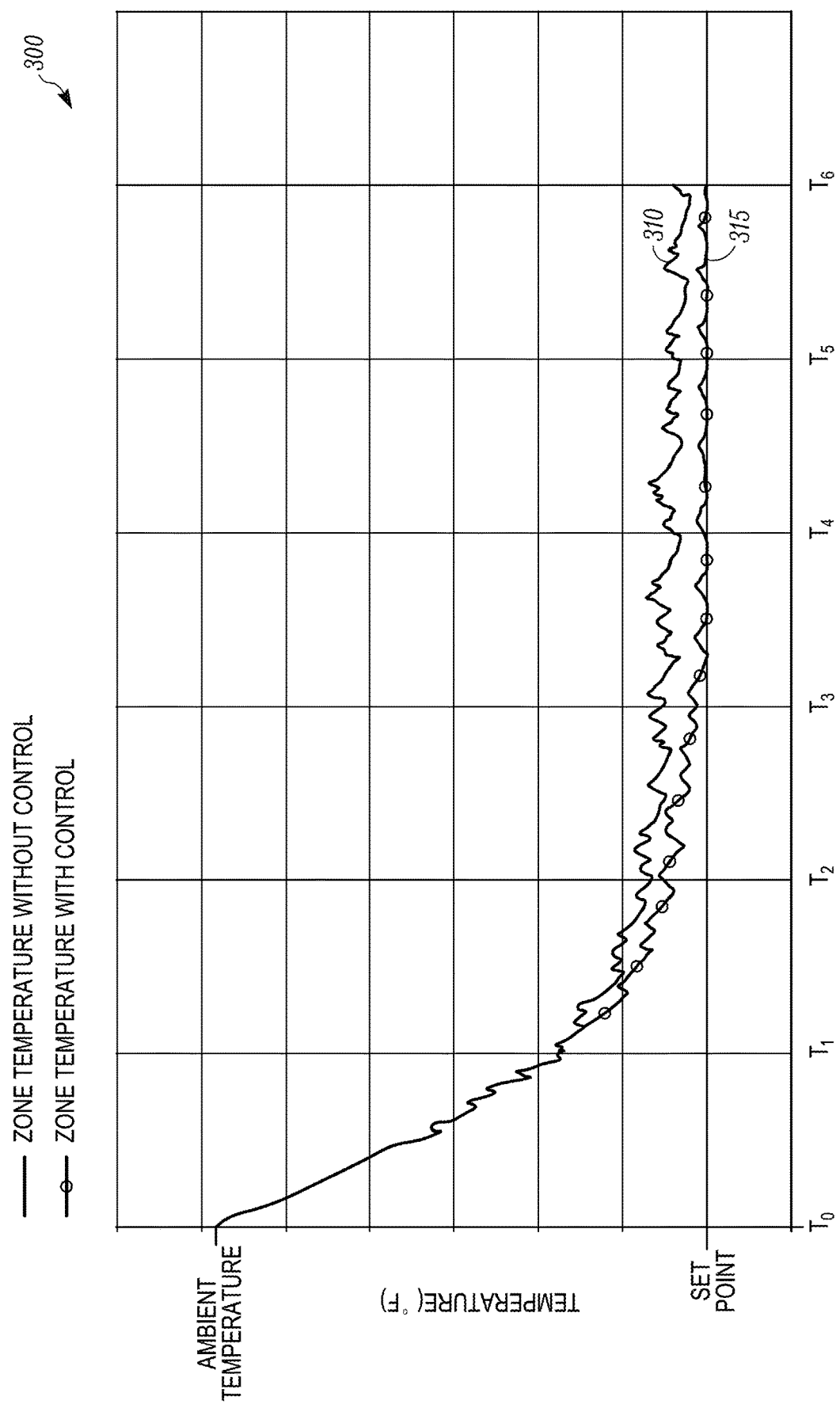
FIG. 3 illustrates a graph of a temperature pulldown simulation within a frozen temperature zone of a MTRS over time, according to one embodiment.

FIG. 3 illustrates a graph 300 of a temperature pulldown simulation within a frozen temperature zone of a MTRS (e.g., the first zone 152a shown in FIG. 1) over time using coordinated temperature control within temperature zones of the transport unit versus non-coordinated temperature control within the temperature zones of the transport unit. The graph 300 illustrates a temperature within the frozen temperature zone along the y-axis and a time period along the x-axis. The graph 300 includes a first simulation curve 310 illustrating the temperature within the frozen temperature zone over time when the MTRS does not use a coordinated zone temperature control between the fresh temperature zones (e.g., the second and third zones 152b,c shown in FIG. 1) and the frozen temperature zone. The graph 300 also includes a second simulation curve 315 illustrating the temperature within the frozen temperature zone over time when the MTRU uses a coordinated zone temperature control between the fresh temperature zones and the frozen temperature zone, as illustrated in the embodiments described herein.

As shown in FIG. 3, the first simulation curve 310 and the second simulation curve 310 are at an ambient temperature at time $T_0$. However, after time period $T_1$ (in one embodiment about 2 hours), the second simulation curve 315 is able to cool down faster than the first simulation curve 310. Also, while the second simulation curve 315 reaches the desired set point temperature (in one embodiment −20° F.) between times T3 and T4 (in one embodiment between 6 to 8 hours), the first simulation curve 310 never reaches the desired set point temperature.

Accordingly, the simulation data provided in FIG. 3 shows that coordinated temperature control within the temperature zones of the transport unit can increase the cooling capacity of the MTRS available for the frozen temperature zone and thereby increase the fuel efficiency of the MTRS. Also, coordinated temperature control within the temperature zones of the transport unit can ensure that the frozen temperature zone can reach the desired set point temperature.

Aspects:

It is appreciated that any of aspects 1-8, 7-14 and 15-21 can be combined.

1. A method for providing environmental condition control of a multi-zone transport refrigeration system (MTRS) within two or more zones of a refrigerated transport unit, the refrigerated transport unit including a first zone and a second zone and the MTRS including a first zone environmental condition unit configured to provide environmental control within the first zone and a second zone environmental condition unit configured to provide environmental control within the second zone, the method comprising:

a MTRS controller determining whether a first zone environmental condition difference between a first zone measured environmental condition and a first zone desired set point environmental condition is greater than a first threshold; and the MTRS controller coordinating operation of the first environmental condition unit and the second environmental condition unit when the first zone environmental condition difference is determined to be greater than the first threshold.

2. The method of aspect 1, wherein the MTRS controller coordinating operation of the first environmental condition unit and the second environmental condition unit includes:

operating the first zone environmental condition unit;

the MTRS controller determining whether a second zone environmental condition difference between a second zone measured environmental condition and a second zone desired set point environmental condition is greater than a second threshold; and operating the second zone environmental condition unit when the second zone environmental condition difference is determined to be greater than the second threshold.

3. The method of aspect 2, further comprising:

shutting off the first zone environmental condition unit when the first zone environmental condition is sufficiently close to the first zone desired set point environmental condition; and shutting off the second zone environmental condition unit when the second zone environmental condition is sufficiently close to the second zone desired set point environmental condition.

4. The method of any one of aspects 1-3, operating a third zone environmental condition unit for a third zone of the refrigerated transport unit when the first zone environmental condition unit and the second zone environmental condition unit are off.

5. The method of aspect 4, wherein the first zone is a fresh temperature zone, the second zone is a fresh temperature zone and the third zone is a frozen temperature zone.

6. The method of any of aspects 2-5, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

7. The method of any of aspects 2-6, wherein the first threshold is about 5° F. and the second threshold is about 1° F.

8. A multi-transport refrigeration system (MTRS) for a refrigerated transport unit, the refrigerated transport including a plurality of zones, the MTRS comprising:
a first environmental condition unit configured to control an environmental condition within a first zone of the refrigerated transport unit;
a second environmental condition unit configured to control the environmental condition within a second zone of the refrigerated transport unit; and
a MTRS controller configured to control operation of the first environmental condition unit and the second environmental condition unit,
wherein the MTRS controller is configured to determine whether a first zone environmental condition difference between a first zone measured environmental condition and a first zone desired set point environmental condition is greater than a first threshold, and
wherein when the first zone environmental condition difference is determined to be greater than the first threshold, the MTRS controller is configured to coordinate operation of the first zone environmental condition unit and the second zone environmental condition unit.

9. The MTRS of aspect 8, wherein the MTRS controller is configured to coordinate operation of the first zone environmental condition unit and the second zone environmental condition unit includes the MTRS controller being configured to:
operate the first zone environmental condition unit in order to reach the first zone desired set point environmental condition,
determine whether a second zone environmental condition difference between a second zone measured environmental condition and a second zone desired set point environmental condition is greater than a second threshold, and
operate the second zone environmental condition unit when the second zone environmental condition difference is determined to be greater than the second threshold in order to reach the second zone desired set point environmental condition.

10. The MTRS of aspect 9, wherein the MTRS controller is configured to:
shut off the first zone environmental condition unit when the first zone environmental condition is sufficiently close to the first zone desired set point environmental condition, and
shut off the second zone environmental condition unit when the second zone environmental condition is sufficiently close to the second zone desired set point environmental condition.

11. The MTRS of any one of aspects 8-10, further comprising a third zone environmental condition unit configured to control the environmental condition of a third zone of the refrigerated transport unit, wherein the MTRS controller is configured to:
operate the third zone environmental condition unit for the third zone of the refrigerated transport unit when the first zone environmental condition unit and the second zone environmental condition unit are off.

12. The MTRS of aspect 11, wherein the first zone is a fresh temperature zone, the second zone is a fresh temperature zone and the third zone is a frozen temperature zone.

13. The MTRS of any one of aspects 9-12, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

14. The MTRS of any of aspects 9-13, wherein the first threshold is about 5° F. and the second threshold is about 1° F.

15. A refrigerated transport unit comprising:
a transport unit having an internal spaces that includes a plurality of zones;
a multi-transport refrigeration system (MTRS) including:
a first environmental condition unit configured to control an environmental condition within a first zone of the refrigerated transport unit;
a second environmental condition unit configured to control the environmental condition within a second zone of the refrigerated transport unit; and
a MTRS controller configured to control operation of the first environmental condition unit and the second environmental condition unit,
wherein the MTRS controller is configured to determine whether a first zone environmental condition difference between a first zone measured environmental condition and a first zone desired set point environmental condition is greater than a first threshold, and
wherein when the first zone environmental condition difference is determined to be greater than the first threshold, the MTRS controller is configured to coordinate operation of the first zone environmental condition unit and the second zone environmental condition unit.

16. The refrigerated transport unit of aspect 15, wherein the MTRS controller is configured to coordinate operation of the first zone environmental condition unit and the second zone environmental condition unit includes the MTRS controller being configured to:
operate the first zone environmental condition unit in order to reach the first zone desired set point environmental condition,
determine whether a second zone environmental condition difference between a second zone measured environmental condition and a second zone desired set point environmental condition is greater than a second threshold, and
operate the second zone environmental condition unit when the second zone environmental condition difference is determined to be greater than the second threshold in order to reach the second zone desired set point environmental condition.

17. The refrigerated transport unit of aspect 16, wherein the MTRS controller is configured to:
shut off the first zone environmental condition unit when the first zone environmental condition is sufficiently close to the first zone desired set point environmental condition, and
shut off the second zone environmental condition unit when the second zone environmental condition is sufficiently close to the second zone desired set point environmental condition.

18. The refrigerated transport unit of any one of aspects 15-17, wherein the MTRS further includes a third zone environmental condition unit configured to control the environmental condition of a third zone of the refrigerated transport unit, wherein the MTRS controller is configured to:
operate the third zone environmental condition unit for the third zone of the refrigerated transport unit when the first zone environmental condition unit and the second zone environmental condition unit are off.

19. The refrigerated transport unit of aspect 18, wherein the first zone is a fresh temperature zone, the second zone is a fresh temperature zone and the third zone is a frozen temperature zone.

20. The refrigerated transport unit of any of aspects 16-19, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

21. The refrigerated transport unit of any of aspects 15-20, wherein the first threshold is about 5° F. and the second threshold is about 1° F.

Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method for providing environmental condition control of a multi-zone transport refrigeration system (MTRS) within two or more zones of a refrigerated transport unit, the refrigerated transport unit including a first zone and a second zone and the MTRS including a first zone environmental condition unit configured to provide environmental control within the first zone and a second zone environmental condition unit configured to provide environmental control within the second zone, the method comprising:
a MTRS controller determining whether a first zone environmental condition difference between a first zone measured environmental condition and a first zone desired set point environmental condition is greater than a first non-zero threshold; and
the MTRS controller coordinating operation of the first environmental condition unit and the second environmental condition unit when the first zone environmental condition difference is determined to be greater than the first non-zero threshold, wherein the MTRS controller coordinating operation of the first environmental condition unit and the second environmental condition unit includes:
providing a refrigerant flow through the first zone environmental condition unit, and
concurrently providing the refrigerant flow through the second zone environmental condition unit when the MTRS controller determines that a second zone environmental condition difference between a second zone measured environmental condition and a second zone desired set point environmental condition is greater than a second non-zero threshold, the second non-zero threshold being a lower temperature value than the first non-zero threshold to allow the MTRS controller to coordinate the refrigerant flow through the first zone environmental condition unit and the second zone environmental condition unit at the same time.

2. The method of claim 1, further comprising:
shutting off the refrigerant flow through the first zone environmental condition unit when the first zone environmental condition is sufficiently close to the first zone desired set point environmental condition; and
shutting off the refrigerant flow through the second zone environmental condition unit when the second zone environmental condition is sufficiently close to the second zone desired set point environmental condition.

3. The method of claim 1, operating a third zone environmental condition unit for a third zone of the refrigerated transport unit when the first zone environmental condition unit and the second zone environmental condition unit are off.

4. The method of claim 3, wherein the first zone is a fresh temperature zone, the second zone is a fresh temperature zone and the third zone is a frozen temperature zone.

5. The method of claim 1, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

6. The method of claim 1, wherein the first non-zero threshold is 5° F. and the second non-zero threshold is 1° F.

7. A multi-transport refrigeration system (MTRS) for a refrigerated transport unit, the refrigerated transport including a plurality of zones, the MTRS comprising:
a first environmental condition unit configured to control an environmental condition within a first zone of the refrigerated transport unit;

a second environmental condition unit configured to control the environmental condition within a second zone of the refrigerated transport unit; and a MTRS controller configured to control operation of the first environmental condition unit and the second environmental condition unit, wherein the MTRS controller is configured to determine whether a first zone environmental condition difference between a first zone measured environmental condition and a first zone desired set point environmental condition is greater than a first non-zero threshold, and wherein when the first zone environmental condition difference is determined to be greater than the first non-zero threshold, the MTRS controller is configured to coordinate operation of the first zone environmental condition unit and the second zone environmental condition unit such that the MTRS controller is configured to:

provide a refrigerant flow through the first zone environmental condition unit, and concurrently provide the refrigerant flow through the second zone environmental condition unit when the MTRS controller determines that a second zone environmental condition difference between a second zone measured environmental condition and a second zone desired set point environmental condition is greater than a second non-zero threshold, the second non-zero threshold being a lower temperature value than the first non-zero threshold to allow the MTRS controller to coordinate the refrigerant flow through the first zone environmental condition unit and the second zone environmental condition unit at the same time, wherein the first zone is a fresh temperature zone and the second zone is a fresh temperature zone.

8. The MTRS of claim 7, wherein the MTRS controller is configured to:

shut off the refrigerant flow through the first zone environmental condition unit when the first zone environmental condition is sufficiently close to the first zone desired set point environmental condition, and shut off the refrigerant flow through the second zone environmental condition unit when the second zone environmental condition is sufficiently close to the second zone desired set point environmental condition.

9. The MTRS of claim 7, further comprising a third zone environmental condition unit configured to control the environmental condition of a third zone of the refrigerated transport unit, wherein the MTRS controller is configured to:

operate the third zone environmental condition unit for the third zone of the refrigerated transport unit when the first zone environmental condition unit and the second zone environmental condition unit are off.

10. The MTRS of claim 9, wherein the first zone is a fresh temperature zone, the second zone is a fresh temperature zone and the third zone is a frozen temperature zone.

11. The MTRS of claim 7, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

12. The MTRS of claim 7, wherein the first non-zero threshold is 5° F. and the second non-zero threshold is 1° F.

13. A refrigerated transport unit comprising:

a transport unit having an internal spaces that includes a plurality of zones;

a multi-transport refrigeration system (MTRS) including:

a first environmental condition unit configured to control an environmental condition within a first zone of the refrigerated transport unit;

a second environmental condition unit configured to control the environmental condition within a second zone of the refrigerated transport unit; and a MTRS controller configured to control operation of the first environmental condition unit and the second environmental condition unit, wherein the MTRS controller is configured to determine whether a first zone environmental condition difference between a first zone measured environmental condition and a first zone desired set point environmental condition is greater than a first non-zero threshold, and wherein when the first zone environmental condition difference is determined to be greater than the first non-zero threshold, the MTRS controller is configured to coordinate operation of the first zone environmental condition unit and the second zone environmental condition unit such that the MTRS controller is configured to:

provide a refrigerant flow through the first zone environmental condition unit, and concurrently provide the refrigerant flow through the second zone environmental condition unit when the MTRS controller determines that a second zone environmental condition difference between a second zone measured environmental condition and a second zone desired set point environmental condition is greater than a second non-zero threshold, the second non-zero threshold being a lower temperature value than the first non-zero threshold to allow the MTRS controller to coordinate the refrigerant flow through the first zone environmental condition unit and the second zone environmental condition unit at the same time, wherein the first zone is a fresh temperature zone and the second zone is a fresh temperature zone.

14. The refrigerated transport unit of claim 13, wherein the MTRS controller is configured to:

shut off the refrigerant flow through the first zone environmental condition unit when the first zone environmental condition is sufficiently close to the first zone desired set point environmental condition, and shut off the refrigerant flow through the second zone environmental condition unit when the second zone environmental condition is sufficiently close to the second zone desired set point environmental condition.

15. The refrigerated transport unit of claim 13, wherein the MTRS further includes a third zone environmental condition unit configured to control the environmental condition of a third zone of the refrigerated transport unit, wherein the MTRS controller is configured to:

operate the third zone environmental condition unit for the third zone of the refrigerated transport unit when the first zone environmental condition unit and the second zone environmental condition unit are off.

16. The refrigerated transport unit of claim 15, wherein the first zone is a fresh temperature zone, the second zone is a fresh temperature zone and the third zone is a frozen temperature zone.

17. The refrigerated transport unit of claim 13, wherein the first zone environmental condition difference is a first zone temperature difference, the first zone measured environmental condition is a first zone measured temperature, the first zone desired set point environmental condition is a first zone desired set point temperature, the first zone environmental condition unit is a first zone heat exchanger unit, the second zone environmental condition difference is a second zone temperature difference, the second zone measured environmental condition is a second zone measured temperature, the second zone desired set point environmental condition is a second zone desired set point temperature, the second zone environmental condition unit is a second zone heat exchanger unit.

* * * * *